United States Patent
Svensson

[19]
[11] Patent Number: 6,062,502
[45] Date of Patent: May 16, 2000

[54] SELF-LOCKING SAFETY BELT DEVICE WITH RETRACTOR SWITCHING FUNCTION

[75] Inventor: Robert Svensson, Fristad, Sweden

[73] Assignee: Autoliv Development AB, Sweden

[21] Appl. No.: 09/126,037

[22] Filed: Jul. 29, 1998

[30] Foreign Application Priority Data

Jul. 29, 1997 [DE] Germany .......................... 197 32 454

[51] Int. Cl.[7] .............................................. B60R 22/415
[52] U.S. Cl. ...................................................... 242/382.2
[58] Field of Search ........................... 242/382.2, 382.1, 242/382.4; 280/806, 807; 297/476, 478

[56] References Cited

U.S. PATENT DOCUMENTS

| | | | |
|---|---|---|---|
| 5,271,578 | 12/1993 | Jabusch ................................ | 242/382.2 |
| 5,474,247 | 12/1995 | Bareiss .................................. | 242/382.2 |
| 5,772,145 | 6/1998 | Bareiss et al. ....................... | 242/382.2 |
| 5,794,879 | 8/1998 | Huber . | |

FOREIGN PATENT DOCUMENTS

| | | |
|---|---|---|
| 0084955 | 8/1983 | European Pat. Off. . |
| 0535551 | 4/1993 | European Pat. Off. . |
| 0543520 | 5/1993 | European Pat. Off. . |

*Primary Examiner*—John M. Jillions
*Attorney, Agent, or Firm*—Robert W. Becker & Associates

[57] ABSTRACT

A self-locking safety belt device has a housing and a reeling shaft rotatably mounted therein. A vehicle-sensitive control system including a control disc acts on a locking member for locking rotation of the reeling shaft when the vehicle sensitive control system is activated. A control device including a switching lever acts on the control disc such that in a release position the switching lever is disengaged from the control disc so that the control disc rotates freely with the reeling shaft. In a locking position the switching lever secures the control disc against rotation and initiates locking of the reeling shaft. The control device has first and second gear wheels with a switching cam. The first gear wheel is connected to the reeling shaft. The second gear wheel is spaced at a distance from the first gear wheel and is rotatably mounted at the housing. The control device also has a crown gear enclosing and meshing with the first and second gear wheels. The crown gear is slidably mounted at the housing. The switching cams of the first and second gear wheels cooperate with a switching cam of the crown gear to move the crown gear between two control positions for controlling the release position and the locking position of the switching lever.

7 Claims, 3 Drawing Sheets

SELF-LOCKING SAFETY BELT DEVICE WITH RETRACTOR SWITCHING FUNCTION

BACKGROUND OF THE INVENTION

The present invention relates to a self-locking safety belt device, especially for motor vehicles, comprising at least one vehicle-sensitive control system for the locking member, which in its locking position prevents further rotation of the belt reeling shaft, and further comprising a control device which, for the retracted belt, provides a release position for the control disc rotating with the belt reeling shaft, whereby the control disc is a component of the vehicle-sensitive control system, and, for a predetermined removal state of the belt, secures the control disc against further rotational movement and initiates the locking of the safety belt device. The control device comprises a first gear wheel connected to the reeling shaft and a second gear wheel, whereby both gear wheels have switching cams arranged thereat with which a switching lever for initiating locking of the control disc is movable.

A safety belt device of the aforementioned kind is known from European patent 0 535 551. In the known safety belt device a first gear wheel is arranged on the belt reeling shaft which, depending on the switching position, meshes with one of two further gear wheels positioned on a pivotable arm supported on the safety belt device. The three gear wheels have a respective switching cam whereby two of the switching cams in predetermined belt removal states will come into contact with one another. Further rotation of the belt reeling shaft with the resulting belt removal, respectively, a spring pulling action then causes pivoting of the pivot arm. The pivot arm in turn moves a spring arm, functioning as a switching lever and cooperating with the outer toothing of the control disc, between a release position and a locking position for the control disc. The securing of the control disc against further rotational movement relative to further rotation of the belt reeling shaft then causes deflection of the locking member and thus locking of the safety belt device. This embodiment of the safety belt device ensures that, upon reaching a predetermined removal length of the belt, the locking system of the belt device is always activated so that any further removal of belt results in locking of the safety belt device thus making further belt removal impossible, while belt retraction onto the safety belt device, i.e., reverse movement of the belt reeling shaft, will release the activation of the locking system when the corresponding switching position is surpassed.

The known safety belt device has the disadvantage that for realization of the disclosed control mechanism a plurality of components, such as pivot arm, gear wheels, movable switching lever, and a spring, are required whose manufacture and assembly are complicated and expensive. It is therefore an object of the present invention to simplify the control mechanism of a safety belt device with the aforementioned features.

SUMMARY OF THE INVENTION

The basic idea of the present invention is to position the second gear wheel at a distance to the first gear wheel that is fixedly connected to the reeling shaft at the housing of the safety belt device. Furthermore, a crown gear surrounding both gear wheels is provided and has inwardly extending teeth. The gear wheels mesh with the surrounding crown gear. The crown gear has a switching cam and is slidably connected to the housing between two positions. The switching cams provided at the gear wheels will provide the activation action for moving the crown gear between the two respective positions. The movement of the switching lever is thus controlled by the movement of the crown gear. The invention has the advantage that a lower number of components is required. Furthermore, premounting of the gear wheels at the lid of the housing as well as of the crown gear, including the guide element provided according to one embodiment of the invention, is possible. This simplifies the assembly of the safety belt device.

According to one embodiment of the invention, it is suggested that the crown gear is rotatably arranged at a guide element that can be moved together with the crown gear relative to the housing. The guide element is designed for activation of the switching lever.

In an alternative embodiment of the invention, the switching lever can be a unitary part of the guide element so that movement of the guide element will directly bring the switching lever into engagement with the respective component, or, alternatively, the switching lever can be supported at the housing and is moved into its locking position by the guide element.

According to another embodiment of the invention, the guide element may comprise a switching arm as well as a projection. Furthermore, it is suggested to embody the switching lever and the sensor lever as a common (unitary) part.

According to another embodiment of the invention, the guide element, that is movably or slidably supported at the housing, is secured in its opposite positions by a spring arm cooperating with a projection of the housing. For improving guiding of the guide element during its movement, between the respective switching positions is suggested to embody the connection between the guide element and the housing by a tongue-and-groove connection.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 3.

Figure 1:
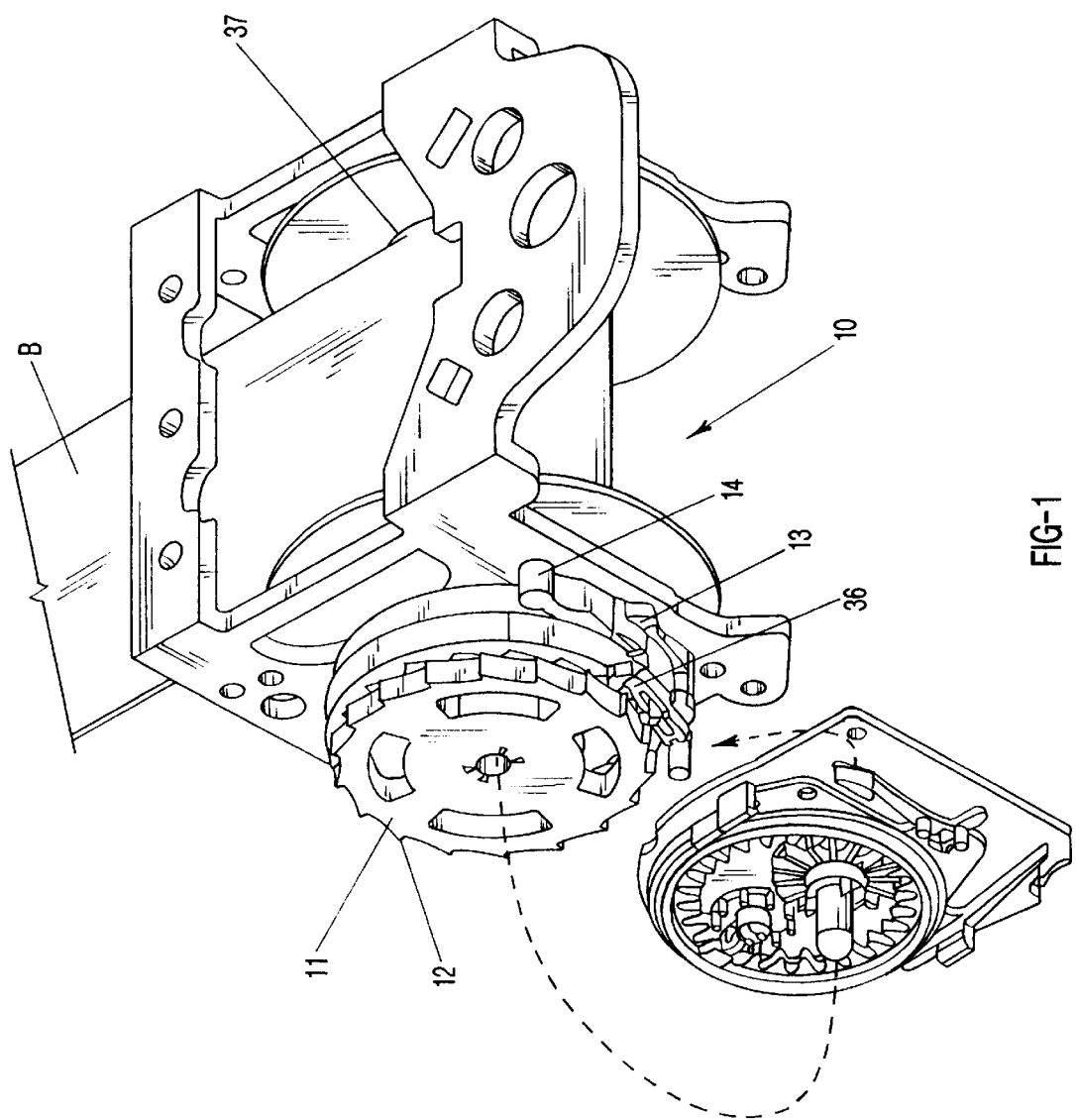
FIG. 1 shows a schematic representation of a safety belt device with vehicle-sensitive control system.

FIG. 1 shows a self-locking safety belt reeling device 10 with a vehicle-sensitive control system in a schematic representation. The control disc 11 with outer toothing cooperates with a non-represented, known vehicle sensor in the form of a ball sensor. The vehicle sensor comprises a sensor lever 13 which, upon actuation of the vehicle-sensitive control system, will bring the switching lever 36, due to movement of the ball from its rest position into the activated position, into engagement with the outer toothing 12 of the control disc 11 so that the control disc 11 is secured against further rotation. As mentioned in connection with the prior art, further belt removal of belt B for a locked control disc 11 results in a deflection of the locking member 14 and thus in locking of the safety belt device.

The inventive design will now be explained in detail with the aid of FIGS. 2a, 2b and 3. A first gear wheel 21 is supported in a housing cover 20 that encloses the control disc 11. When assembling the safety belt device 10, the gear wheel 21 fixedly engages the belt winding shaft 37 rotatably mounted in the housing so that the gear wheel 21 will constantly turn with the reeling shaft 37. Between two individual teeth the gear wheel 21 has a switching cam 22.

The housing cover 20 of the housing furthermore receives a second gear wheel 23 with coordinated switching cam 24 such that the two gear wheels 21, 23 rotate independent from one another and will not contact one another with their toothing, respectively, switching cams.

Also, a crown gear 25 with inner toothing is provided that surrounds the two gear wheels 21, 23 and has a switching cam 26. It is arranged such that the toothing of the gear wheel 21 as well as of the gear wheel 23 mesh respectively with the inner toothing of the crown gear 25 so that each rotation of the gear wheel 21, fixedly connected to the reeling shaft 37, causes a rotation of the second gear wheel 23 by rotation of the crown gear 25.

The crown gear 25 is rotatably supported on the guide element 27. The guide element 27 is moveably arranged at the housing cover 20 in the direction of double arrow 32. Accordingly, movement of the crown gear 25 in the direction of arrow 32 results also in the same movement of the guide element 27. The toothing of the gear wheels 21, 23, on the one hand, and of the crown gear 25, on the other hand, are linked such that meshing engagement of the toothings with one another is maintained in both moved end positions (compare FIGS. 2a, 2b).

The guide element 27 has connected thereto as a unitary part a switching arm 28 which projects with its projection 33 from the plane of the housing cover 20 in the direction of the ball sensor so that movement of the guide element 27 moves the projection 33 of the switching arm 28 into contact with the switching lever 36 and moves the lever 36 into the outer toothing 12 of the control disc 11.

For guiding the guide element 27 at the housing cover 20, two tongue-and-groove connections with tongues 34 connected to the guide element 27 and grooves 35 provided at the housing cover 20 are provided. Furthermore, the guide element 27 can be secured in both respective switching positions by a spring arm 29 arranged on the guide element 27 and movable with its projection 30 across the projection 31 provided at the housing cover 20. The position of the projection 30 of the spring arm 29 relative to the projection 31 secures and determines the two switching positions of the guide element 27.

Figure 3:
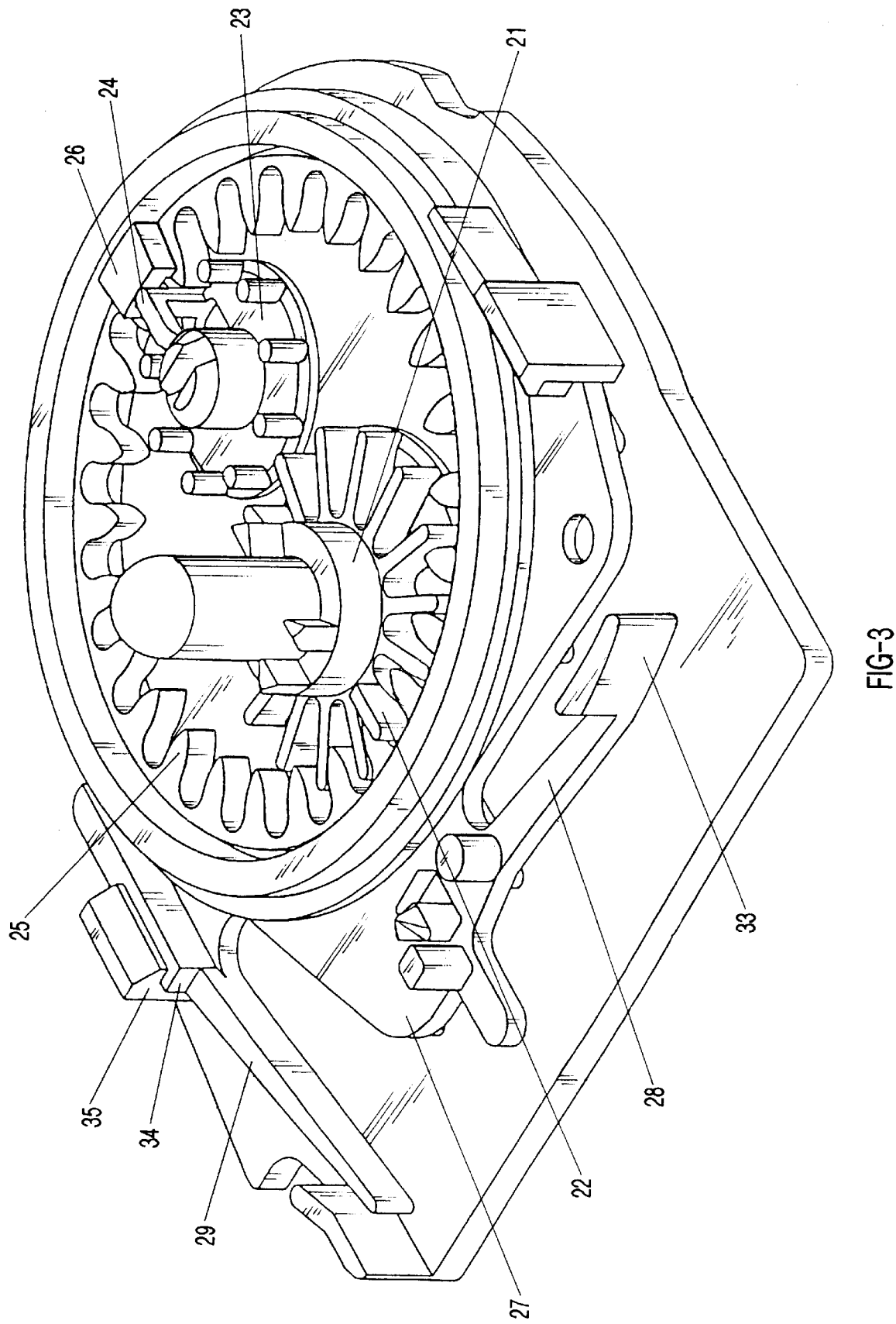
FIG. 3 shows the control device with gear wheels, crown gear, and guide element in a schematic perspective representation.

As can be taken in detail from FIG. 3, the movement of the guide element 27 and the required intermeshing of the respective toothing of the gear wheels 21, 23 with a crown gear 25 is realized by the respective switching cams 22, 24, 26 being positioned above the plane of the toothings.

Figure 2A:
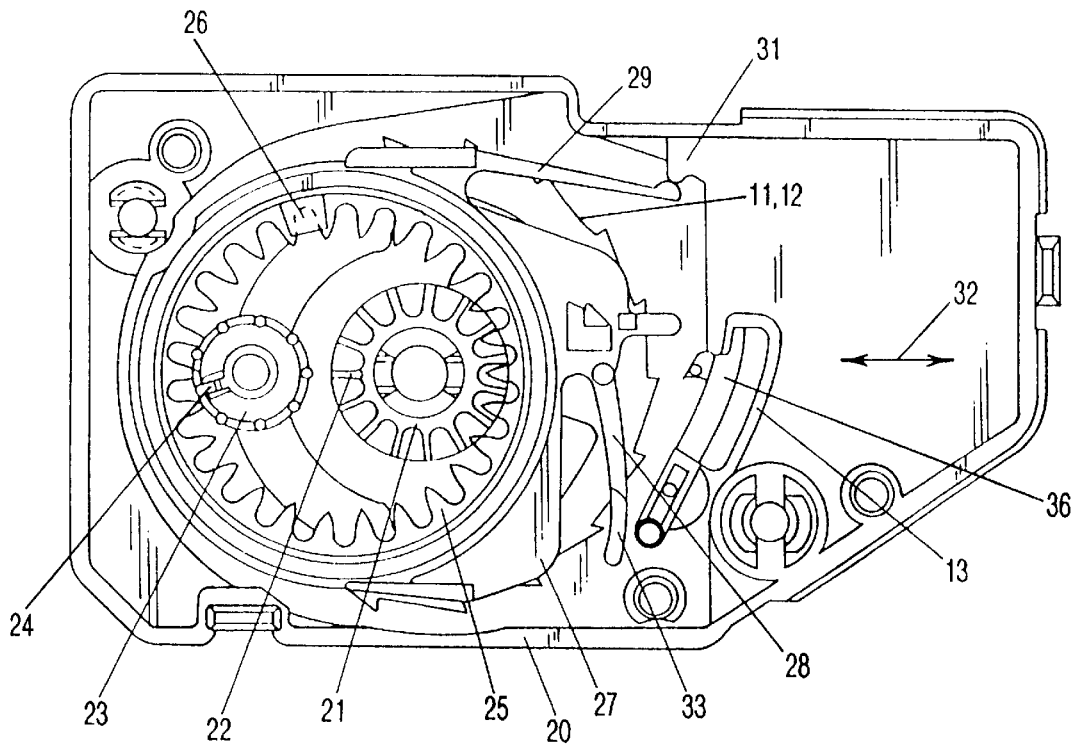
FIG. 2a shows a plan view onto the inner side of a housing cover with the control device arranged thereat, showing the switching lever in the release position of the control disc.
Figure 2B:
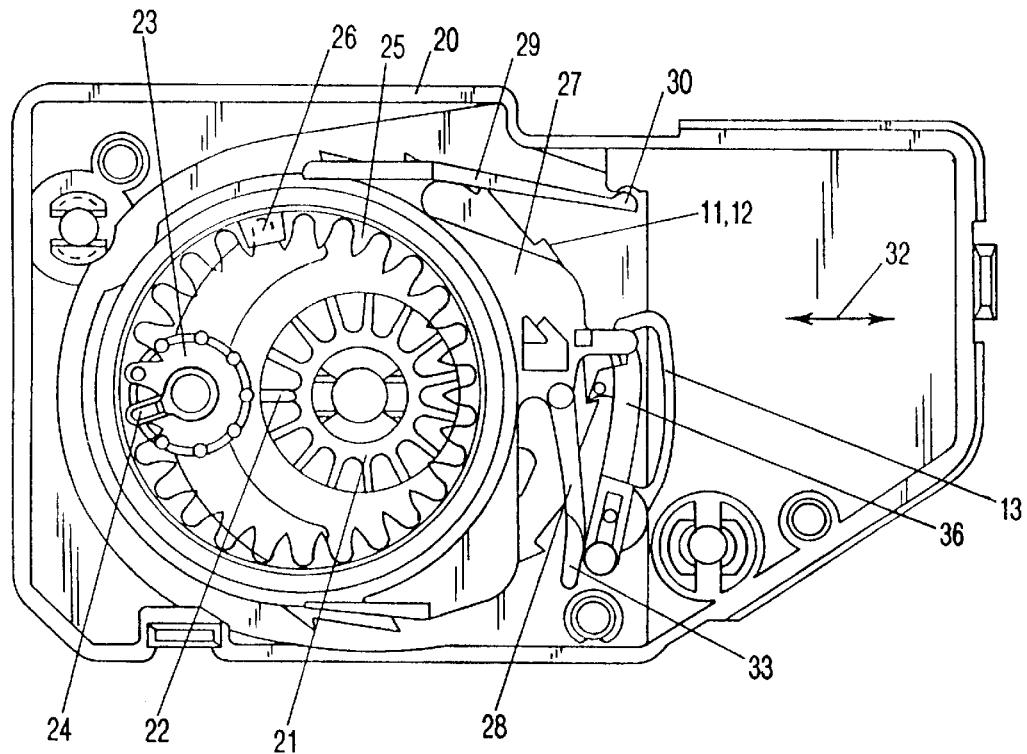
FIG. 2b shows the device of FIG. 2a with the control disc in the locking position initiated by the switching lever.

FIG. 2a shows the initial position of the control device in which the switching arm 28 is not loaded by the combined switching lever 36/sensor lever 13 of the vehicle-sensitive control system. In this switching position, the control disc 11 is released. When belt B is removed from the reeling shaft 37, the gear wheel 21 rotates with the reeling shaft 37 until, after completion of a certain number of revolutions defining the desired removal state, the switching cam 22 of the gear wheel 21 will engage the switching cam 26 of the crown gear 25. The engagement of the switching cams 22, 26 will move the guide element 27 in the direction of double arrow 32 into the opposite switching position (FIG. 2b) in which the projection 33 of the switching arm 38 moves the combined switching lever 36/sensor lever 13 into the outer toothing 12 of the control disc 11 so that a permanent locking of the safety belt device is ensured. This movement requires guiding of the guide element 27 by the tongue-and-groove connection 34, 35 at the housing 20. The projection 30 is moved to the other side of the projection 31 and is secured in this end position.

When belt is retracted onto the reeling shaft 37, a return movement of the reeling shaft 37 takes place. The correlated rotation of the gear wheel 21 is transmitted via the crown gear 25 onto the gear wheel 23 which thus rotates also. Its switching cam 24 will engage the switching cam 26 of the crown gear 25, and the crown gear 25, and thus the guide element 27, is returned into the initial position shown in FIG. 2a in which the combined switching lever 36/sensor lever 13 is released.

The specification incorporates by reference the disclosure of German priority document 197 32 454.1 of Jul. 29, 1997.

The present invention is, of course, in no way restricted to the specific disclosure of the specification and drawings, but also encompasses any modifications within the scope of the appended claims.

What is claimed is:

1. A self-locking safety belt device for a motor vehicle, said safety belt device comprising:
   a housing (20);
   a reeling shaft (37) rotatably mounted in said housing (20);
   a vehicle-sensitive control system (13) acting on a locking member (14) for locking rotation of said reeling shaft (37) when said vehicle-sensitive control system (13) is activated;
   said vehicle-sensitive control system comprising a control disk (11) mounted on said reeling shaft (37);
   a control device (21,23,25) including a switching lever (36) acting on said control disk (11) such that in a release position said switching lever (36) is disengaged from said control disk (11) so that said control disk (11) rotates freely with said reeling shaft (37) and such that in a locking position said switching lever (36) secures said control disk (11) against rotation and initiates locking of said reeling shaft (37);
   said control device comprising a first gear wheel (21) and a second gear wheel (23),
   said first and second gear wheels (21,23) each having a switching cam (22, 24);
   said first gear wheel (21) connected to said reeling shaft (37);
   said control device further comprising a switching lever (28);
   said second gear wheel (23) spaced at a distance from said first gear wheel (21) and rotatably mounted at said housing (20);
   said control device further comprising a crown gear (25) enclosing said first and said second gear wheel (21, 23) and having radially inwardly extending teeth and a switching cam (26), wherein said crown gear (25) meshes with said first and second gear wheels (21, 23);
   said crown gear (25) slidably mounted at said housing;

said switching cams (22, 24) of said first and second gear wheels (21, 23) cooperating with said switching cam (26) of said crown gear (25) to move said crown gear (25) between two control positions for controlling said release position and said locking position of said switching lever (36).

2. A safety belt device according to claim 1, further comprising a guide element (27) slidably mounted at said housing (20), wherein said crown gear (25) is rotatably mounted on said guide element (27) such that guide element (27) is moved together with said crown gear (25) between said two control positions, said guide element (27) moving said switching lever (36) into said release position and said locking position.

3. A safety belt device according to claim 2, wherein said switching lever (36) is connected to said housing (20) and is moved by said guide element (27) when said guide element (27) is moved together with said crown gear (25).

4. A safety belt device according to claim 3, wherein said guide element (27) comprises a switching arm (28) with a projection (33), wherein said projection (33) acts on said switching lever (36) for moving said switching lever (36) into said locking position.

5. A safety belt device according to claim 2, wherein said vehicle-sensitive control system comprises a sensor lever (13) and wherein said switching lever (36) and said sensor lever (13) form a unitary part.

6. A safety belt device according to claim 2, wherein said housing (20) has a projection (31) and said guide element (27) comprises a spring arm (29) resting at said housing projection (31) for securing said guide element (27) in said two control positions.

7. A safety belt device according to claim 2, wherein said guide element (27) is connected to said housing (20) by a tongue-and-groove connection (34, 35).

* * * * *